United States Patent [19]

Gray et al.

[11] Patent Number: 4,783,761

[45] Date of Patent: Nov. 8, 1988

[54] SPELLING CHECK DICTIONARY WITH EARLY ERROR SIGNAL

[75] Inventors: R. William Gray, Ithaca; Donald T. Adams, Homer, N.Y.; Howard C. Duncan, IV, Marathon, all of N.Y.

[73] Assignee: Smith Corona Corporation, Cortland, N.Y.

[21] Appl. No.: 813,351

[22] Filed: Dec. 26, 1985

[51] Int. Cl.⁴ ............................................. G06F 7/04
[52] U.S. Cl. ................................................ 364/900
[58] Field of Search ... 364/900 MS File, 200 MS File; 400/63

[56] References Cited

U.S. PATENT DOCUMENTS

| | | | |
|---|---|---|---|
| 4,328,561 | 5/1982 | Convis et al. | 364/900 |
| 4,383,307 | 5/1983 | Gibson, III | 364/900 |
| 4,498,148 | 2/1985 | Glickman | 364/900 |
| 4,499,553 | 2/1985 | Dickinson et al. | 364/900 |
| 4,651,300 | 3/1987 | Suzuki et al. | 364/900 |

Primary Examiner—Gareth D. Shaw
Assistant Examiner—Debra A. Chun

[57] ABSTRACT

A method and apparatus for adding a low-cost spelling check dictionary feature to document preparation systems such as portable electronic typewriters, the spelling check being performed on a character-by-character basis and an error signal emitted upon the earliest determination that an input character does not conform to that of any word listed in the dictionary. Semiconductor ROM is used for storage of the dictionary listing and for program control of the spelling check. Text compression methods are utilized to permit storage of large vocabularies (about 35,000 words) while minimizing the ROM capacity required (about 3 IC's of 256K bits each).

11 Claims, 5 Drawing Sheets $\equiv \equiv \equiv$ 2

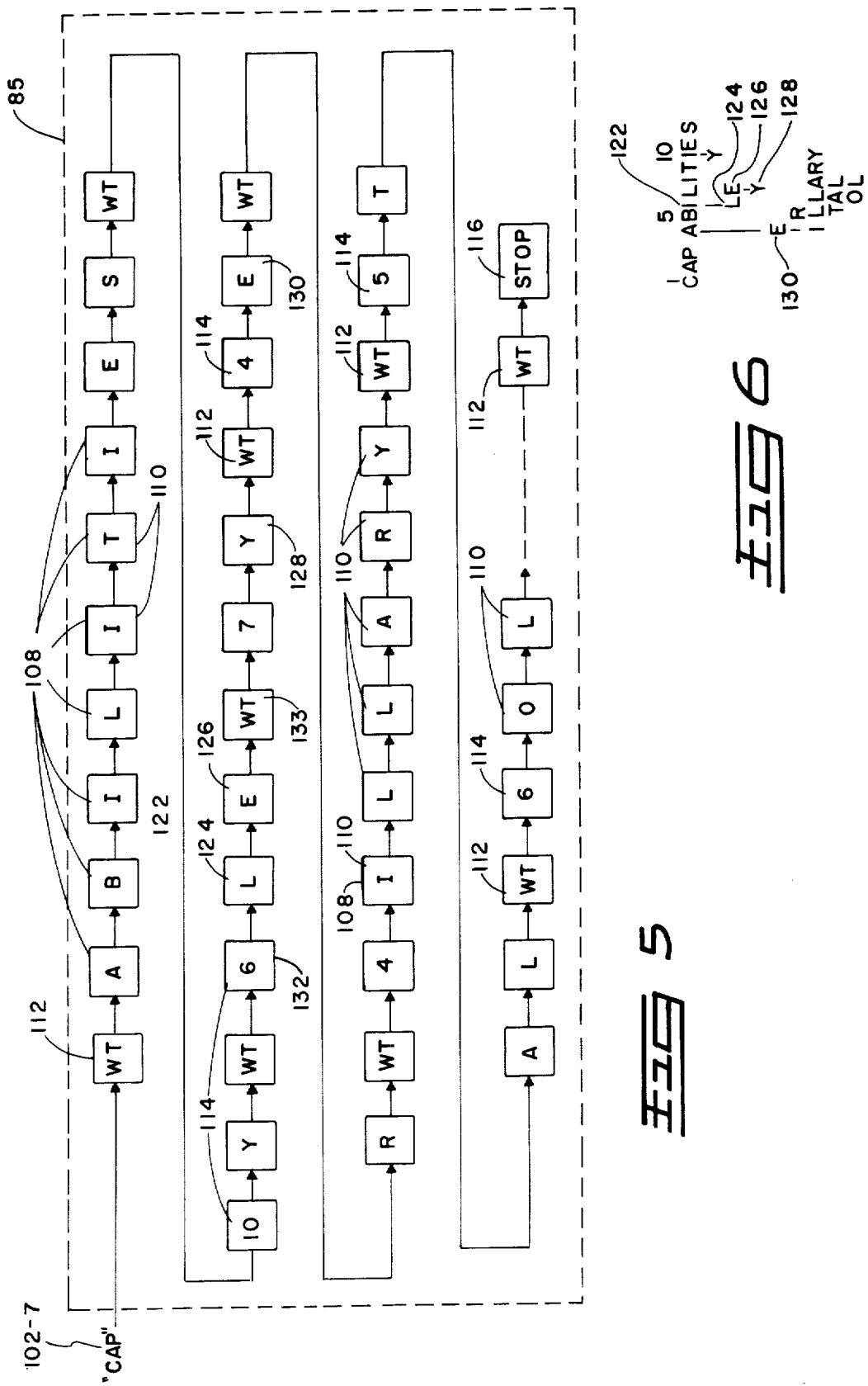

SPELLING CHECK DICTIONARY WITH EARLY ERROR SIGNAL

BACKGROUND OF THE INVENTION

1. Field of the Invention

The present invention relates to a dictionary storage apparatus containing a word list structured to verify the spelling order of character inputs.

2. Description of the Prior Art

Creating documents free of spelling errors and typographical errors is a paramount concern in written communications. The likelihood of generating spelling error free documents is only as good as the spelling and typing ability and motor skills (the tendency to introduce typographical errors such as transposition of adjacent characters of a word, inadvertent dual depression of adjacent keys, etc.) of the typist and the liklihood that spelling errors will be overlooked is high especially since typographical errors are difficult to catch.

While spelling-check dictionaries are known, they have generally been a costly feature available only on expensive word processors and personal computers, for example. In particular, they have not been provided in low-cost document preparation systems such as personal typewriters of the portable electronic type. Further, the known dictionaries have not operated on a real time, character-by-character basis, the spelling check being performed only after a complete word has been entered. The typist thus has had to guess where the error lies. The result has been that a dictionary has had to be kept at hand or at least close by even when a spelling check was a feature. Accordingly, there is a need for a low-cost dictionary/spelling check feature for inclusion in a portable electronic typewriter, the spelling check occurring at each character entry and errors being signaled promptly for more efficient use of the typewriter.

SUMMARY OF THE INVENTION

A dictionary storage method and apparatus containing a word list used to verify the spelling order of character inputs comprising: input means for receiving character inputs; a first storage means for storing character information structured to sequentially check the spelling order of a first predetermined series of received character inputs; a second storage means extending from the first storage means and containing further character information structured to check the spelling order of a variable string of character inputs stemming from the above-mentioned predetermined series to validate spelling of words; and signal output means connected to the first and second storage means for generating a signal indicating that a received character input is out of spelling order as structured in the first and second storage means.

It is thus an object of the invention to provide a dictionary which gives a prompt indication when an input character is out of spelling order based on the word list stored therein.

A further object of the invention is to provide a dictionary which stores a large vocabulary while requiring minimal internal space for same.

Other objects and features of the invention will become evident from a reading of the ensuing description taken in conjunction with the drawing.

BRIEF DESCRIPTION OF THE DRAWING

FIG. 5 is a schematic diagram showing a typical branch in the tree-structured look-up table extension or second storage area of FIG. 2, each branch containing a number of words with a common root, i.e.—sharing at least a particular three characters from the look-up tables, though some words may share additional characters in the branch.

FIG. 6 is a schematic diagram showing the order in which characters of the word list portion of FIG. 5 are stored.

DESCRIPTION OF THE PREFERRED EMBODIMENT

Figure 1:
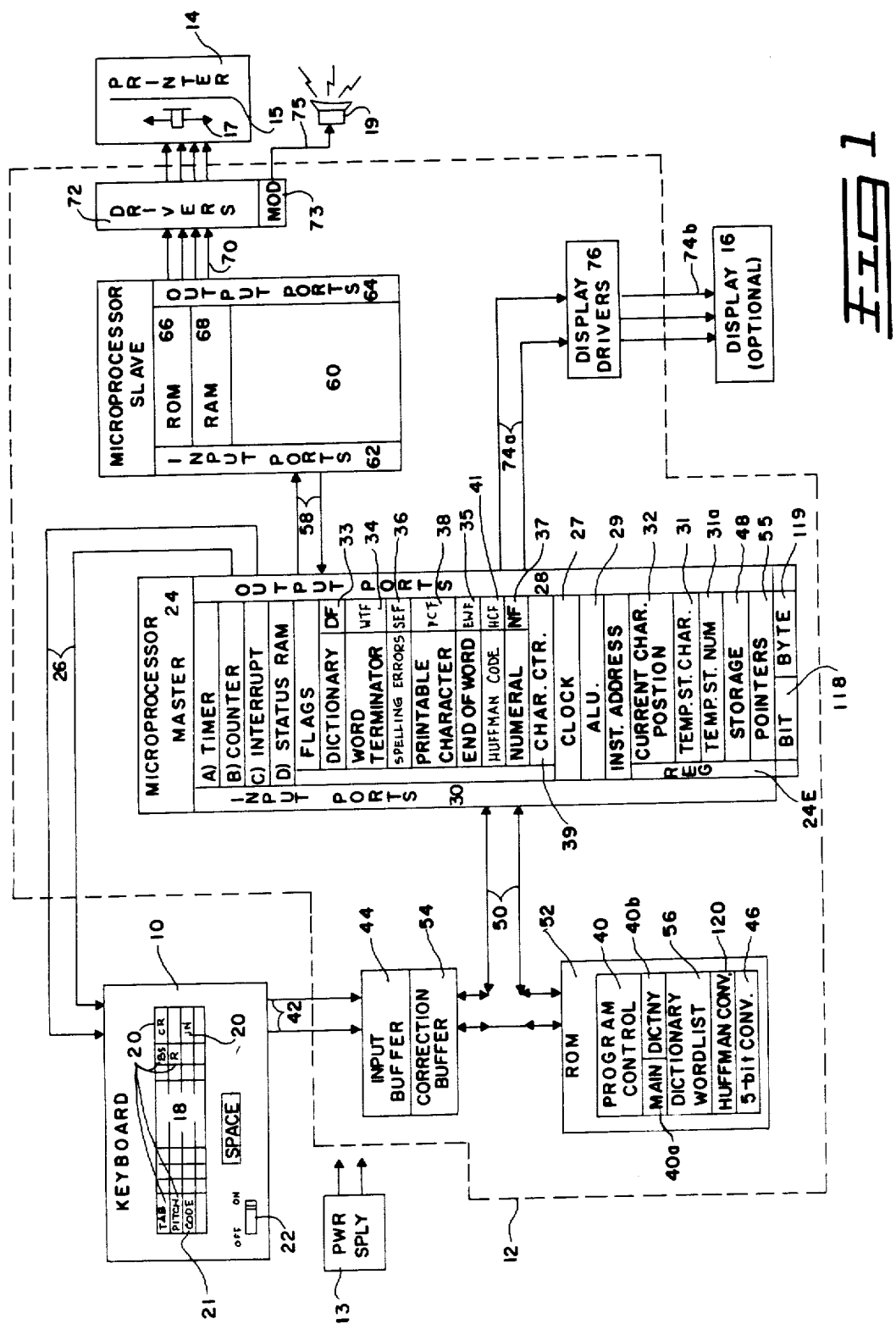
FIG. 1 is a block diagram of the spelling check dictionary according to the invention.

The invention will now be described as embodied in an interactive word information processing system, such as the kind shown in block diagram form in FIG. 1. The word information system of FIG. 1 has three principal units comprising a keyboard 10, an electronic control circuit 12 (encircled by dashed lines), and a printer unit 14.

Keyboard 10 includes a normal set of symbol keys 18, relating to printable characters, numbers and punctuation marks. In addition, keyboard 10 includes typewriter function keys 20 for issuing special function commands in the system. Some of the special function keys 20 are labeled in FIG. 1 and include: carriage return (R), backspace (BS), index (IN), tab (TAB), pitch (PITCH), correct (CR), and space (SPACE). A "code" function key 21 (always operated in conjunction with one of the special function keys 20 or one of the symbol keys 18) serves to select an operative mode of the system, such as a known correction sequence or the "dictionary" mode according to the invention as discussed below. A "keyboard enable" switch 22 has an ON and an OFF position for selectively enabling and disabling operation of keyboard 10. Depression of any one of the various keys 18, 20 on keyboard 10 operates a respective switch matrix (not shown, but a known 8×8 or 10×6 unit or other desired arrangement of rows and columns) which is scanned periodically by electronic circuit 12 in a known manner to generate a respective keyboard output signal provided the "keyboard enable" switch 22 is in the ON position. Each keyboard output signal is uniquely related to the key commands of keyboard 10. The three principal units 10, 12 and 14 of FIG. 1 interact in the usual fashion in that manual selection of a desired typewriter function is made at keyboard 10. Printer unit 14 is operated—in turn—under control of the electronic circuit 12 for accomplishing the function selected by a keyboard input—such as, for example, printing a character corresponding to a selected character key 18. The three principal units 10, 12 and 14 are preferably embodied in an electronic typewriter unit. Alternatively, the units 10, 12 and 14 may comprise individual components combined in a manner common to many word processing systems.

For scanning purposes keyboard 10 is connected to bus lines 26 operated by a master microprocessor 24 located within the electronic control circuit 12. Master microprocessor 24 is a known electronic component, e.g., the 8031 processor made by Intel Corporation of Santa Clara, Calif. Master microprocessor 24 typically has output ports 28, input ports 30 and various electronic control elements including a number of storage registers. Some operative elements in the master microprocessor 24 include (A) TIMER, (B) COUNTER, (C) INTERRUPT, and (D) STATUS RAM (a "Random Access Memory"). TIMER 24A is a conventional unit for providing predetermined time delays, as required in the system. COUNTER 24B functions to continually update the system's operation during interruption in the system. INTERRUPT 24C periodically initiates an electronic scan of keyboard 10 to determine whether a new key selection has been made since the prior scan. STATUS RAM 24D provides temporary storage of current keyboard information for reference and recall purposes as will be seen. Storage registers in the master microprocessor 24 include, as just one example (others being identified subsequently), a Current Character Position register 32 which keeps track of the current character position in relation to a previous reference position along a type line 15 of printer 14 as the character information is printed. In addition, the storage registers include provision for a plurality of FLAGS including a "Dictionary" flag 33, "word terminator" flag 34, an "end-of-word" flag 35, a "spelling error" flag 36, a numeral flag 37, a "printable character" flag 38 and a "Huffman code" flag 41. These flags 33-38 and 41 are single bit memories periodically interrogated as part of the machine's program routine. As is known, a flag can have two states, namely set (true) or clear (false). The current state of each flag 33-38 is stored in an associated single cell of STATUS RAM 24D. Only flags relevant to the invention are discussed herein and other flags such as those for repeat mode, backspace mode, etc. may also exist, as is known in connection with word information processing systems. RAM 24D also includes a byte 39 which functions as a Character Counter (software), being incremented by unity as each character is entered.

Master microprocessor 24 communicates with keyboard 10 through a known interrupt technique. INTERRUPT 24C in master microprocessor 24 is operated over line 26 periodically (e.g. every 7 milliseconds) under control of the TIMER 24A for scanning the keyboard 10 to detect any key depressions. In response to detection of a key depression, a unique signal representative of the selected key (18,20,21), is issued on lines 42 to a Buffer Chip 44.

Buffer Chip 44 (an "I/O Expander" multi-purpose LSI chip, such as the 8156 also available from Intel) transfers the signal set to a decoder section 46 and a FIFO storage section 48. Keyboard signals are temporarily held in FIFO storage section 48 for sequential release in the order of input, each being fetched under program control (see below) for known decoding by Microprocessor 24 in response to completion of processing a previous keyboard input. Microprocessor 24, as a result of this decoding provides a daisy position code signal on a bus line 50 when the signal in FIFO section 48 is a character signal that originated from depressing just a printable symbol key 18. Non-printable special function signals arising from depressing keys 20 (or keys 18, 20 in combination with the code key 21) are also decoded into Printer Format or other control data for subsequent processing. The capacity of FIFO storage section 48 is sufficient to hold a multiplicity of keyboard signals temporarily so as to allow enough time for typewriter functioning without sacrifice of typing speed. As seen in FIG. 1, the printer code signals from FIFO section 48 appear on a bi-directional bus line 50, connected to a ROM 52 (Read-Only Memory—e.g., the 256K bit 23256), a RAM 54 (included as part of an Intel 8156) and to input ports 30 of master microprocessor 24. In this instance, the printer code signals are sent to RAM area 54 for storage.

ROM 52 includes the Program Control section 40 and a Dictionary storage section 56 according to the present invention. The Program Control section 40 of ROM 52 contains as a main program 40a, the necessary instructions to operate master microprocessor 24 in a prescribed manner (e.g. one similar to those known for control of "daisy-wheel" typewriters), together with a secondary set 40b of program instructions for a Spelling Check type of operation according to the invention. The Dictionary storage section 56 of ROM 52 contains a multiplicity of addressable codes assembled to form words of a word list used to verify the spelling order of characters upon release of printer decode signals from RAM area 54 as described in more detail below. RAM 54 primarily functions as a correction buffer for keeping track of the last plurality of printable character inputs for orderly recall but is also used for purposes of the invention, as will be described. Character inputs are stored in a particular RAM area 54 of Input Buffer Chip 44, in the form in which they are processed for printing and/or display under control of master microprocessor 24, this storage area 54 retaining the characters for correction purposes and therefore being referred to hereinafter as "Correction Buffer" 54.

Codes from internal or external memories (e.g. STATUS RAM 24D of master microprocessor 24, RAM 54) are communicated along the serial output channels 58 of master microprocessor 24 to a further microprocessor 60 which is slaved with respect to microprocessor 24 as master. Slave microprocessor 60 (e.g. the 8049 also made by Intel and similar to the 8031 except for presence of 2K bytes of program memory using a less powerful instruction set, as is known) has input ports 62 and output ports 64. Additionally, slave microprocessor 60 has its program stored internally in a ROM (Read-Only Memory) 66 and the current code data stored internally in a RAM 68, these code data being read from RAM 68 as necessary for the program in ROM 66 to develop in known fashion the control and drive signals communicated to Printer Drivers 72 over lines 70. Printer Drivers 72 receive the code data read from RAM 68 and decode these to send appropriate signals to operate the printing components of printer 14, including a daisy-type printwheel 17 supporting the printable characters. Furthermore, Display Drivers 76 connected to Master Microprocessor 24 by lines 74a serve to operate (via lines 74b) display 16 (e.g. a known liquid crystal 5×8 dot matrix) for visually presenting the last plurality (16, say) of character inputs in known fashion. The display 16 is an optional feature and, if present, may be operated in conjunction with or independently of printer 14.

A general description relating to the basic operation of character input in the word information processing system of FIG. 1 will now be given. Operator depression of a keyboard key (18, 20, 21) is detected in known fashion by a scan of keyboard 10 initiated by the known INTERRUPT 24C and issued on bus 26 to keyboard 10. A unique signal representative of the selected key is then generated on lines 42 and sent through Input Buffer Chip 44 and then to FIFO section 48 where the signal is stored until decoded by Microprocessor 24 in known fashion. If determined that the selected key is one of the printable character symbol keys 18, flag 38 is set. If the key selected is one of the special function keys 20 (as possibly modified by simultaneous depression with CODE key 21) another flag such as Dictionary Flag 33 may be set. Each key input enters through temporary storage 48 for first in-first out release in response to processing of all preceding key inputs, as is known. Each decoded signal released on bus line 50 is applied essentially simultaneously to ROM 52 and RAM 54 by master microprocessor 24. In ROM 52, Program Control 40 is interrogated or read for appropriately operating master microprocessor 24 according to desired program routines in known fashion. The decoded signal from line 50 may also be applied—according to the invention—to Dictionary section 56 for spelling check purposes as described later. It will be remembered, though, that the decoded signal is sequentially stored as Daisy Position or Printer Format Codes suitable for recall purposes during correction sequences. The just-mentioned printer codes are too unwieldy for spelling check purposes, hence a further code conversion is needed. The preferred code is a simple 5-bit binary expression of the alphabetic order from 1 to 26 for A to Z. This conversion may be readily performed in known fashion by using the printer codes as arguments in a look-up table 46 having the desired codes associated therewith. Table 46 is likewise stored in ROM 52. Master microprocessor 24 under direction of main Program Control 40a operates slave microprocessor 60 for ultimately processing the selected key function at printer 14 (if a printable character or printer format function).

Figure 2:
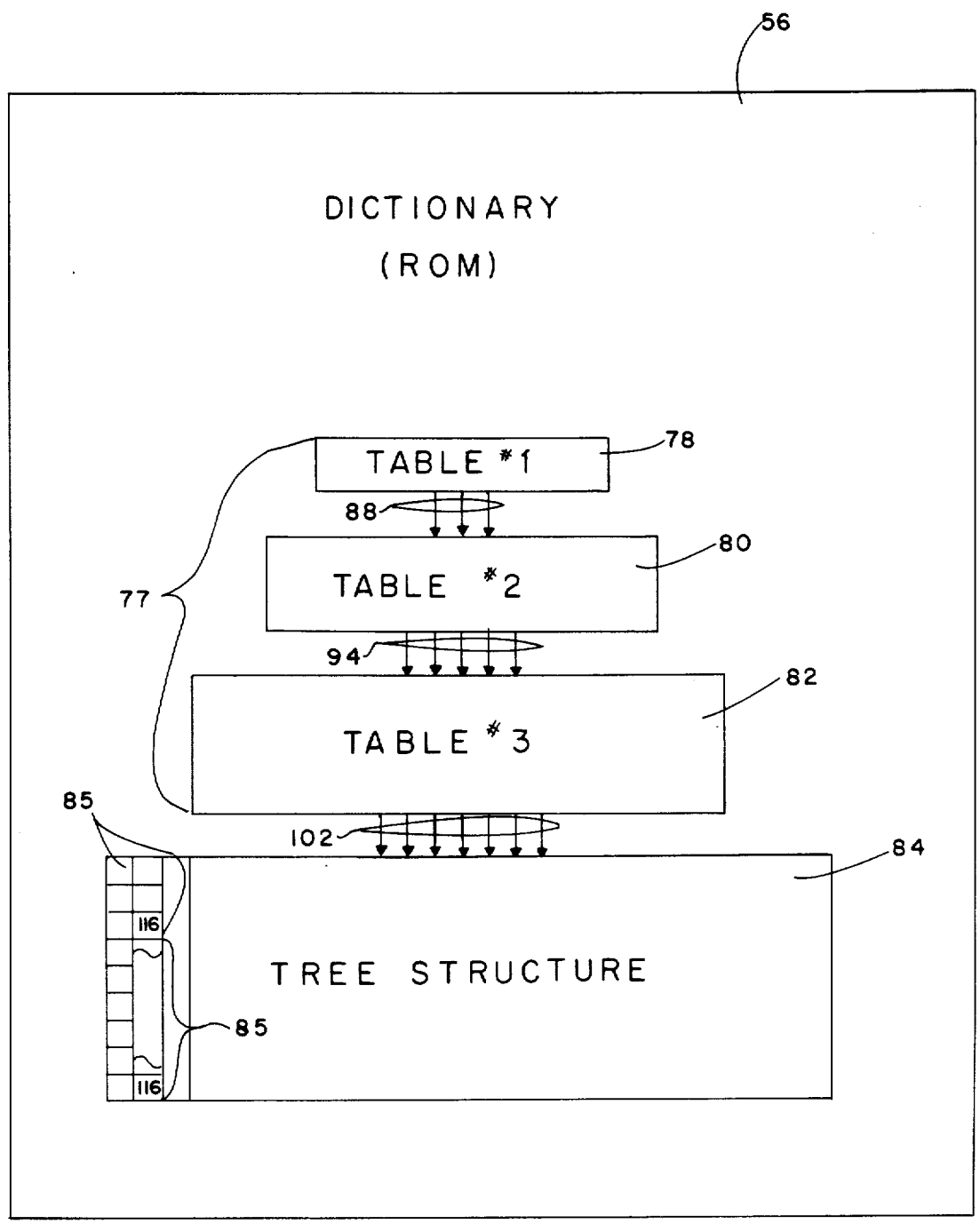
FIG. 2 is a schematic diagram showing the organization of the dictionary of FIG. 1 into two storage areas: three look-up tables for the first three characters in a word, together with a tree structure extending the third table into as many characters as needed on a shared basis for complete coverage of the word list in the dictionary of FIG. 1.

A dictionary storage apparatus according to the teachings of the present invention is described in detail below in view of FIGS. 2—5. In FIG. 2, the major storage areas comprising the Dictionary storage section 56 in ROM 52 are shown. The Dictionary section 56 contains a multiplicity of character address codes relating to particular characters and arranged to provide an alphabetical listing of words. The words are stored using a first storage area 77 in the form of three look-up tables 78–82 (where each character is generally present as a five-bit binary code) and a second storage area 84 in the form of a character tree structure (where each character is generally present in a compressed or "Huffman" code). The three look-up tables 78–82 are connected in series to verify the spelling order of the first three character inputs. The tree structure 84 (as it will be termed hereinafter) extends from the third table 82 and provides the information for verifying the spelling order of characters beyond the third character of the longer words.

Each one of the three tables 78–82 in the first storage area 77 has a multitude of addressable memory locations and each memory location contains a unique output address or "pointer" that relates to a particular character in conjunction with the previous characters of the word. The first table 78 has addresses relating to first character input and establishes the identity of the character (first) beginning the spelling of a word. The second table 80 has addresses arranged in groups, to confirm the spelling order of the second character input in conjunction with the first entered character. The third table 82 has addresses arranged in further groups to verify the spelling order of the first three character inputs. As will be recalled, the order of entry of the characters of a given word upon sequential depression of the desired keys 18 is tracked in the one-byte software counter 39 in Status Ram 24D, the value in the byte being incremented by unity as each entry occurs.

The tree structure (second storage area) 84 has branches 85 individually comprising a string of character memory locations 108 corresponding to additional characters in one or more words having the same three-character root. Each branch 85 is therefore chosen by one address location in the third table 82 for checking the spelling order of the fourth and all subsequent character inputs.

Figure 3:
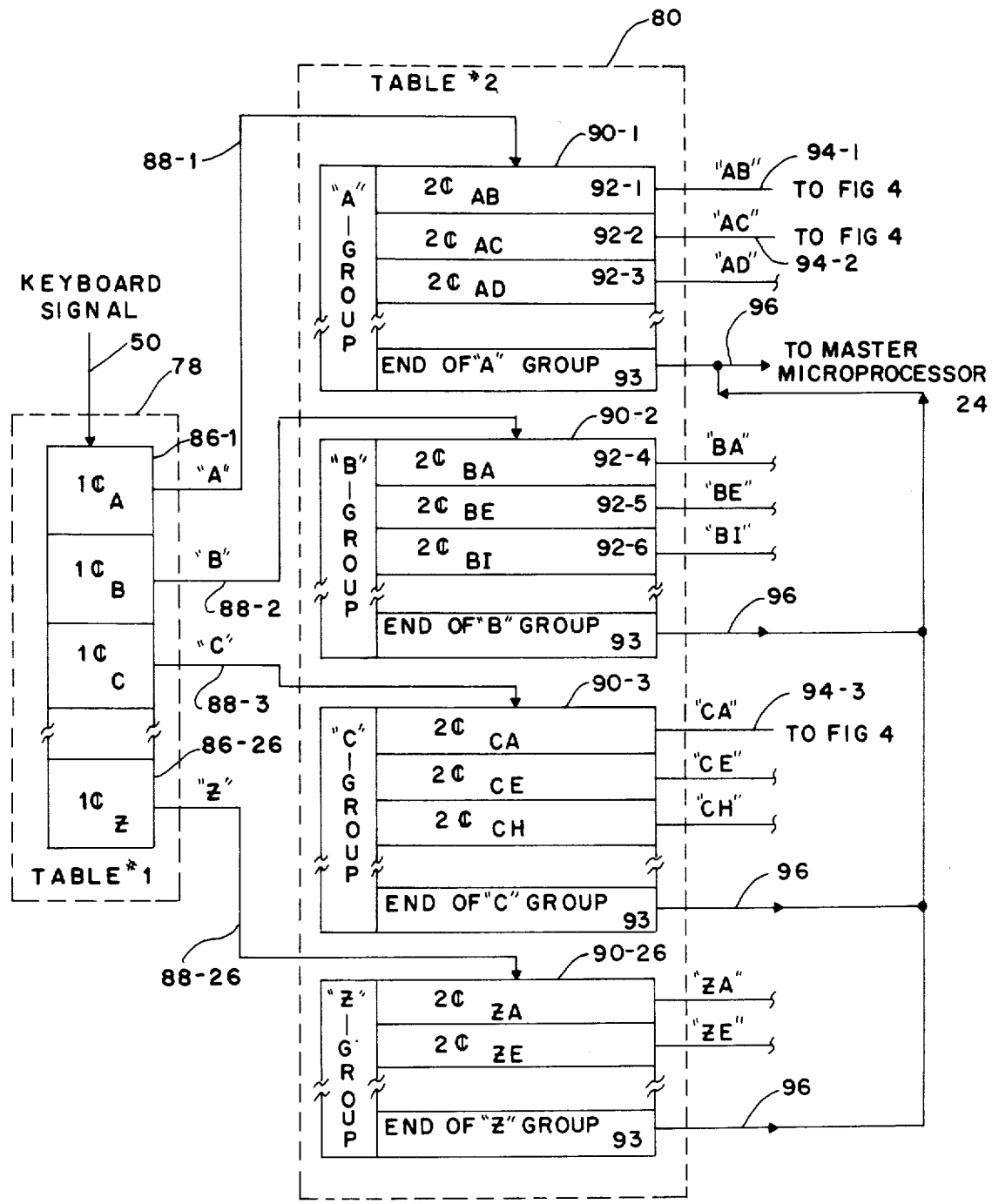
FIG. 3 is a schematic diagram of the first two of the three look-up tables of FIG. 2, these two forming the storage region for the first two characters of words listed in the dictionary of FIG. 1.
Figure 4:
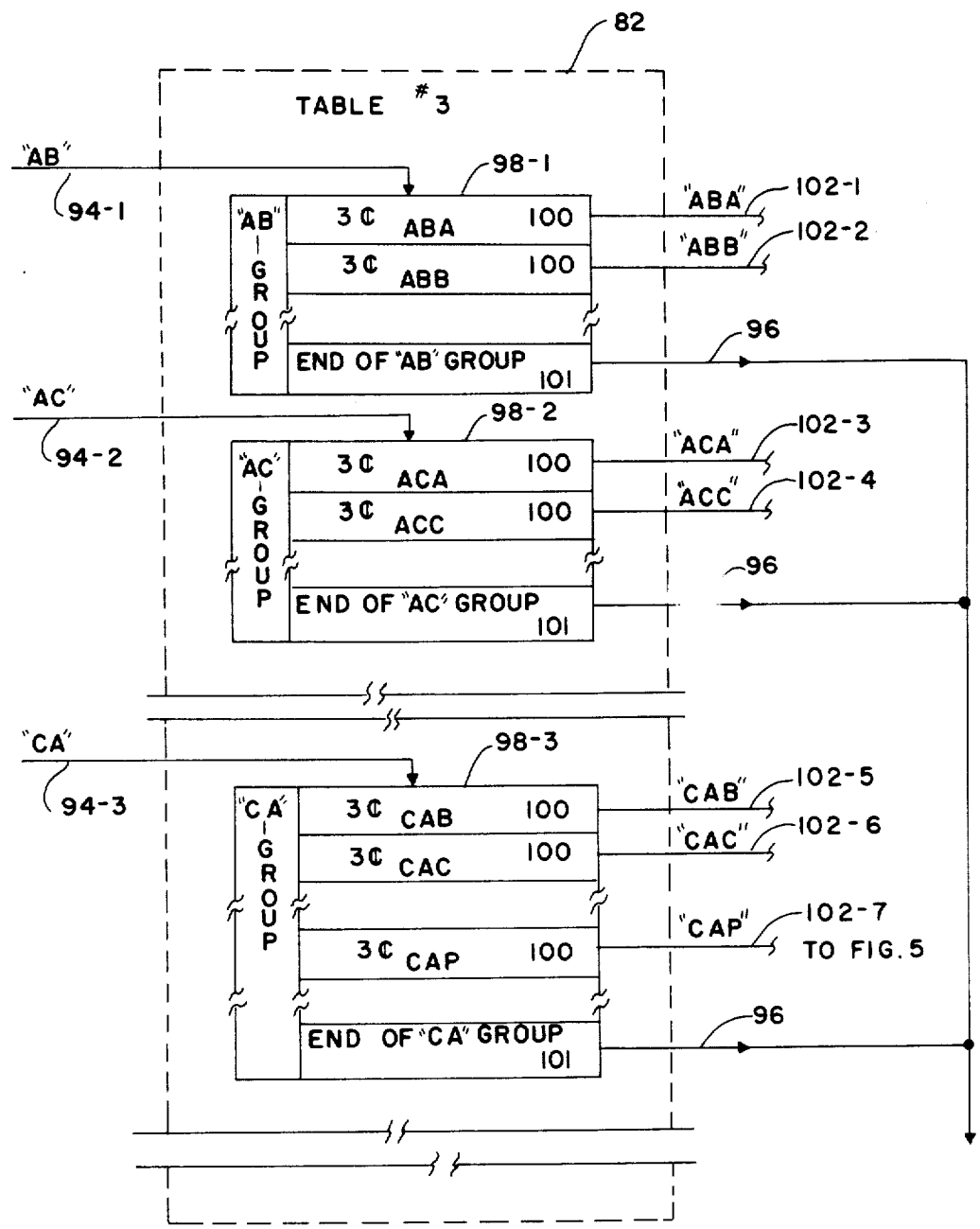
FIG. 4 is a schematic diagram of a third look-up table, this last forming the storage region for third characters of words listed in the dictionary of FIG. 1.

FIGS. 3 and 4 illustrate the unique structural arrangement of connecting character address codes (referred to hereinafter by the stylized letter "₵", for convenience) stacked in each one of the look-up tables 78–82. Each character address code stored in the three tables 78–82 is uniquely identified in the drawing by a numerical prefix signifying the character's position in the word and a character subscript identifying the particular character (or combination of characters). For example, the numerical prefix "one" (1) in the first table 78 signifies the first character input, the prefix "two" (2) in the second table 80 signifies the second character of the input "string" (as the sequence will be termed hereinafter) and the prefix "three" (3) in the third table 82 (FIG. 4) signifies the third character of that string. The subscript character attached on each code is used in the drawing to identify the character at that address easily. Therefore, the address code labeled $1₵_A$ in the first table 78 identifies the first character as being the letter "A" and in the second table 80 the top address $2₵_{AB}$ represents the letter "B" as having necessarily been preceded by the letter "A". The illustrated labeling technique provides an easy character-identifying system for keeping track of the various addresses. The actual address value stored in the respective memory locations depends on the memory arrangement and may be in any logically acceptable form, such as hexadecimal numbers.

In FIG. 3, the first table 78 comprises a stack of twenty-six (26) locations 86 for data storage. Each location 86-n stores a unique output address code that relates directly to one particular character. The labels for these twenty-six address codes in the first table 78 range from $1₵_A$ to $1₵_Z$ to match the letters A to Z. Each address at location 86-n in the first table 78 acts as a pointer 88 extending to the next table 80. Pointers (addresses) 88-n are therefore shown symbolically as connecting lines and labeled "A" to "Z" in FIG. 3 to indicate the source location 86.

In operation, assume the Dictionary mode has been selected (by depression—for example—of Code Key 21 together with a character key 18 such as the "D" key to set the Dictionary Flag 33, the set state of which enables Dictionary Program 40b to initiate the Spelling-check routine). The first character input signal (from line 50)

beginning a word is applied to the first table 78. As stated previously, the signal is expressed as a five-bit binary code (e.g., binary-coded "1" to binary-coded "26") after conversion from the printer code obtained from Correction Buffer 54, as explained earlier. The proper location 86 is determined under direction of the Dictionary program control 40b by simply adding twice the first character's code value to the starting address (arbitrary) of table 78. The value is doubled because the output address code occupies two bytes. The modified code locates the two-byte pointer address code corresponding to the entered character. The pointer code for that character is then saved in the RAM area of Microprocessor 24 but in a two-byte area 55 separate from Correction Buffer 54 where the Daisy Position code corresponding to the first alphabetic character was stored in known fashion immediately upon appearing on bus 50 from FIFO section 48. No error signals are generated upon entry of a first alphabetic character.

The second table 80 in FIG. 3 comprises twenty-six (26) letter groups 90-n (where "n" is a number depending on the identity of the first character of the word entered in keyboard 10) having data storage locations 92 for identifying the second character input. Each group 90 in table 80 is chosen by the value of a respective pointer 88-n extending from the first table 78 (actually that pointer value stored in RAM area 55 upon identifying the first character), such that each group 90 relates to the letter designation of the connected pointer 88. For example, the top group 90-1 in table 80 is chosen by the "A" pointer 88-1 extending from the letter "A" location 86-1 in the first table 78. Therefore, the top group 90-1 is labeled the "A group" and the remaining twenty-five groups (90-2 to 90-26) labeled in corresponding fashion to indicate choice of a unique group for each letter that may have been selected as the first character input.

Each data storage location 92 in a given letter group 90-n contains an eight-bit "argument" byte and two bytes for a unique output address identifying a particular second character in combination with the previously chosen first character. Note that second-character output addresses are provided only for combinations (e.g., 92-4, 92-5 of group 90-2) appearing in those words selected for storage in the present dictionary. The exact number of second-character data storage locations 92-m provided in each group 90-n thus varies according to whether the second character input combines with the first character input to form part (or all) of a word stored in Dictionary section 56, such word being referred to hereinafter as a "valid" word. In this regard, then, first pairs of letter combinations not used to form a valid dictionary word are disregarded so as to minimize the number of storage locations 92 in table 80—i.e. generally much less than 26 for each group 90-n. Entry of an omitted combination is interpreted as an error, as described below.

The two following bytes at each location 92 in table 80 act, in turn, as pointers 94-m for accessing a particular character group in the third table 82 (FIG. 4), the byte values replacing the pointer data in RAM area 55. These pointers 94-m are also shown symbolically as a connecting line and labeled alphabetically in FIG. 3, but now with a paired combination of letters corresponding to the two characters verified at the connected storage location 92-m. Here again, combinations not present in any of the stored words are omitted and their entry into keyboard 10 likewise interpreted as an error.

In operation therefore, after beginning a word, the next (second) character input signal (from bus 50) is applied to the second table (80) at the top location in the selected one of the groups 90-n (e.g., 2$C_A$ of group 90-3 at location 92-7). The successive locations 92-m are then progressively scanned under direction of Dictionary program control 40b to locate an argument code (first byte of three) that matches this second character. This scanning comprises stepping along the table by a three unit incrementation of the pointer value in RAM area 55 after each unsuccessful comparison. Matching may be performed, for example, by use of a standard 8031 "compare" instruction available in the set for Program Control of Master Microprocessor 24. This standard instruction ("CJNE"-Compare, jump if unequal) causes a comparison between the value just entered via bus 50 and the character codes stored at successive locations in the appropriate one of the tables 80, 82 (the character codes being arguments where a look-up table is concerned, as just mentioned) and branches 85 of extension 84. The comparison occurs through a known accumulator forming part of Arithmetic Logic Unit (or "ALU") 29 of Microprocessor 24. When a match is found, therefore, the scan is stopped, and the pointer value (following two bytes) associated with that next character is then saved in RAM 55, replacing the value from table 78 currently stored. The end result is a return to the main program 40a and the awaiting of a further entry in the string at keyboard 10.

A byte termed "end-of-group" (i.e., a "stop" as it may also be termed) designates the lowermost or last storage location 93 of each group 90-n in table 80. Location 93 contains a special code 96 (e.g., 1D in hexadecimal or 11101 binary) common to each "end-of-group" byte 93. As will be explained, the code 96 in "End-of-Group" byte 93 functions to set the Spelling Error flag 36 in the event the second character input is not matched as a result of a scan of all previous locations 92-m in the selected group 90-n. "End-of-Group" byte 93 is reached when the second character input does not combine with the first character input to form the spelling of all (or part) of a valid word (i.e., one stored in Dictionary section 56).

If none of the comparisons in the selected group 90-n of 80 yield a match, then the byte 93 holding an "End-of-Group", or stop code 96 is attained and that code supplied from ROM 52 to Input Ports 30 via bus 50. At this point, however, it should be mentioned that before performing the above-described comparison with the entered character, the Dictionary Program 40b tests each argument code to determine whether it is the "end-of-group" byte 93 (the test may be a known comparison in ALU 29 between the argument code and the special code 96). When the test shows the argument code to be the "End-of-group" code 96, Program Control 40b directs Microprocessor 24 to set Spelling error Flag 36 in known fashion. In response to the set state of Flag 36, a signal is sent over serial communication line 58 to microprocessor 60 to activate Drivers 72, in turn, so as to operate the error alarm—namely, the buzzer or "beeper" 19. Because this same device 19 is also used for indicating the approach of the right margin, the alarm output (line 75) for a spelling error emanates from a modulator 73 (which may be a conventional chopper) to thus provide a distinctive warble as the output of beeper 19 when a spelling error occurs.

FIG. 4 illustrates the third table 82 used for verifying the third character input. Table 82 comprises a multiplicity of three-letter groups 98-p. Each group 98-p is chosen by a related one of the pointers 94-m extending from the second look-up table 80 of FIG. 3 and likewise stored in the 16-bit pointer location (area 55 in RAM 24E). The paired letters used to identify each group 98-p corresponds to the two letters of the connected pointer 94-m,—i.e., the "AB" group 98-1 is chosen by "AB" pointer 94-1.

Groups 98-p each contain a stack of data storage locations 100 likewise three bytes long, each location 100 thus storing an argument byte plus two bytes for a unique output address that relates, in this instance, to the third character input. For example, the first or top storage location 100 in the "AB" group 98-1 contains an address labeled 3 $_{ABA}$. This address or pointer 102-1 selected by the match is used solely for verification when the third character input is the letter "A" preceded by the letters "A" (first character) and "B" (second character). The space-saving storage technique used in the second table 80 is again applied here, a third-character address being provided only for characters present in valid words—i.e., those incorporated in the particular dictionary. The exact number of third-character address locations 100 stacked in each group 98-p thus varies according to whether the third character input is one used in forming just one or many valid words in the dictionary.

A pointer 102-q extends from each address location 100 in the third table 82. Each pointer 102-q connects the third-character address location 100 to a related branch 85 in the extended tree structure 84. In FIG. 4, each pointer 102-q is again correspondingly labeled according to the three-letter combination verified at the location 100. For example, the pointer 102-7 labeled "CAP" extends from the location 100 containing the argument byte 3$\mathbb{C}_{CAP}$ associated with the address (pointer 102-7) selected by the "p" match that verified presence of the sequence CAP in Dictionary section 56.

As in the groups 90-n of the second table 80, an "end-of-group" byte is stored in the bottom or last storage location 101 of each three-letter group 98-p in the third table 82. The same output code 96 is sent from the "end-of-group" locations 101 to the Master Microprocessor 24 and thus also sets Spelling Error flag 36 in the event the third character input fails to produce a match.

As stated earlier, tree structure 84 (FIG. 2) includes a multiplicity of memory locations 108 arranged in discrete branches 85 for verifying the spelling order of valid words beyond the third character. Each branch 85 is chosen by a related one of the pointers 102-q extending from the third table 82 and likewise stored in pointer RAM area 55. A typical branch 85 consisting of a number of memory locations 108 strung together is illustrated in FIG. 5. As seen there, memory locations 108 forming each branch 85 contain pre-programmed information including one or more characters 110 of particular words, related word terminators (WT) 112, one or more numerals 114 denoting nodal points at which prior characters are shared by two or more words and, lastly, a "stop" or "End-Of-Table" (i.e., the end of branch 85) command 116.

At this point it should be recalled that for reasons of word compaction, the characters 110 forming the word parts stored successively in each branch 85 of the tree structure 84 are preferably present in the form of a variable number of bits corresponding to a Huffman code, as will be discussed in more detail shortly. Such known codes are of a type in which the most frequently used characters have the shortest bit-length codes (e.g. three ZERO bits for E, a "2" in three bits of binary code for S, a "2" in four bits of binary code for D, etc.; a complete listing of the preferred codes being appended at the end hereof as appendix (A), and the least frequently used characters have the longest bit-length codes (e.g. thirteen binary bits for J, eleven binary bits for X, etc.). As known, each code is nonetheless unique even when packed in memory without regard to byte boundaries, the bit combinations chosen being such that no short length code can be an initial part of a longer code.

The characters 110 at locations 108 are arranged in the branches 85 to spell the remaining characters of successive valid words that share at least the first three characters verified by the tables 78, 80 and 82. The successive words are separated by the word terminator codes WT 112, each WT code 112 being arranged to follow immediately after the last of a string of characters that correctly spell a valid word in Dictionary section 56. Each WT code 112 functions to set the word terminator flag (WTF) 34 in STATUS RAM 24D in response to Dictionary section 56 verifying the accuracy of the character entry at the immediately preceding location 108.

The numeral byte at each location 114 signifies, on the other hand, a "node"—an ordinal position in a word where preceding characters are shared in forming at least two different words, thus minimizing the requisite storage space by avoiding character duplication. As evident from FIG. 5, each branch 85 stores all characters in a linear succession from start (e.g. 102-7 in FIG. 5) to end (e.g. 116), the various nodes being demarked by the numeral bytes at locations 114, and alternate sub-branches of these nodes being discernible only by those bytes 114 which contain the same number. If the next character input does not match the character code 110 stored at the succeeding location 108 of branch 85, the remaining information stored in the branch is (as described in more detail subsequently) scanned location-by-location for a location 114 storing the identical numeral and comparison with the code 110 in the succeeding character location 108 at this new point again attempted. If a match is not found at this new point also, the process is repeated. Lastly, the stop or "End-Of-Table" command is stored in the terminal or last location 116 of each branch 85, and the output code being identical with that 96 in "end-of-group" locations 93, 101—also sets Spelling Error flag 36 in STATUS RAM 24D. The stop command location 116 is attained only when a character input fails to locate a matching character at a like ordinal position if any of the words in the particular branch 85 scanned—i.e., in any of the word remnants having the same root as was established through use of tables 78–82.

While the foregoing description has perhaps implied a minimum of three characters for each word, it should be remarked that even one character may suffice to identify a distinct word stored in Dictionary 56. As indicated previously with respect to FIG. 5, the last character of each valid word is separated from the succeeding character of a further word (which shared at least some characters) by the "Word Terminator" code 112 (binary 1111—i.e., decimal 15, when the preferred Huffman code is being used). Though not shown in Tables 80, 82 of FIGS. 2 or 3, the Word Terminator Codes 112 are present in these tables too, being included—where appropriate—as part of the eight-bit coded data stored at locations 92, 100. This is made possible by the fact that ROM 52 uses an eight-bit byte structure, the printer code normally used when converting the switch matrix output of keyboard 10 requiring all eight bits, but only five bits being needed to distinguish the alphabetic characters present in the words stored in Dictionary 56—inasmuch as distinction need not be made between upper and lower case. Accordingly, the unused high-order bits of each byte are available for other purposes: one bit order being assigned in the data of Tables 80–82 as a Word Terminator indicator and another (arbitrarily chosen to be the most significant bit) as an indicator that all subsequent characters are stored in the form of Huffman codes and therefore must first be converted to the above-noted five bit code. In this conversion, proper attention must be given, as detailed below, to the position of the initial bit within the code (if other than the first Huffman code, where the first bit always occurs immediately after a byte boundary).

To signal introduction of Huffman coding, the binary value at the most significant position (bit 7, the eighth bit) in each stored code of table 82 is always checked and presence of a ONE bit sets a Huffman code flag 41 and initiates operation of two counters 118, 119 (preferably in software and incremented under control of clock 27 in known fashion), the counting beginning with the next byte and determining, respectively, the number of bits and bytes (every eighth bit) thereafter which define the unique Huffman code. Each Huffman code is serially converted to the corresponding 5-bit code using—in fashion similar to that described in "Introduction to Data Compression" by Harold Corbin, BYTE, April 1981 pp. 218-250—a tree structure 120 forming part of ROM 52 and involving a succession of binary pair nodes, each member of the pair addressing a respective incremental value to be added to the current table address. Each Huffman code thus defines a path through tree 120, the path ending when a discrete table entry (byte) storing a ONE in the most significant position (bit 7) is encountered along with the usual increment. This event signals that the value located at the next address (sum of current address and the increment just specified) is the corresponding 5-bit code which is stored in the less significant five bits of the byte. Accordingly, as each bit of Huffman code is read, the eighth bit of the corresponding table entry is tested and upon finding a ONE in that position, counting is stopped and the current byte count and bit count in counters 118, 119 stored in a respective one of the two bytes at pointer area 55 (overwriting the previous contents) for reference, and the 5-bit code for the character just read in branch 85 supplied to the accumulator in ALU 29 for comparison with the entered character. Upon occurrence of the next character entry, the values stored in pointer area 55 are read, bit counter 118 incremented by unity (with a carry if a binary "7", and resultant incrementing of the byte counter 119); the respective counter 118, 119 set to its new value, if any, and counting operation again enabled for conversion of the next variable-length character read from branch 85 in the manner just described.

This next character may be a word terminator code 112, as above described, but may also be a node indicator that is, the numeral code 114 which designates not only the existance of a node, but also the ordinal position at which each valid word sharing the previously entered and checked characters begins to differ. At this point, then, a mismatch does not initiate an error, it merely indicates that the character at the corresponding position in yet another of the valid words sharing the same characters in the lower ordinal positions must be checked. The word remnants in branch 85 are stored in alphabetical sequence with each remnant (which may include further nodes) preceded by a numeral code 114, hence checking of an entered character is not complete until all remnants preceded by the identical numeral code have had the succeeding character code compared in the known manner previously mentioned. Accordingly, after the first mismatch, the ordinal position from character counter 39 is stored in another Temporary Register 31a, the pointer 55 is incremented by unity and the counters 118, 119 enabled to read successive Huffman codes in branch 85 until a numeral code is detected. This detection occurs during a pre-scan described subsequently with respect to detection of a word terminator code 112. For the present purpose, bit 6 (next-most significant bit in the unused portion of the eight-bit byte) will be a "ONE" if the next data byte is a numeral—114. In such case, the pointer 55 is likewise incremented by a unity and a numeral flag 37 in Status RAM 24D set, the set state of numeral flag 37 causing Dictionary Program 40b to compare the newly designated data byte with the value in Temporary Register 31a. The comparison involves subtraction rather than matching for identity. The reason for this is that all remnants in branch 85 being presented in alphabetical order, as seen in FIG. 6, characters (e.g. 122,124) immediately following the shared characters in different words are at a given ordinal position (e.g. the sixth level for "I" 122 and "L" 124) and further characters in the relevant words can only be at higher ordinal positions. In that case, if a mismatch occurs at a higher level (e.g. the seventh level for the "E" 126 and the "Y" 128 in FIGS. 5 and 6), then scanning of branch 85 (FIG. 5) will produce a borrow when the value in Temporary Register 31a (a seven, read from character counter 39, as previously described) is subtracted from the 4 in the numeral code 114 preceding the "E" 130 which is the next alphabetic character in exemplary branch 85 (WT 112 and numeral code 114 being sensed as controls, not characters). The borrow indicates the impossibility of finding a match, so the Error flag 36 is set immediately to make unnecessary any further scanning to find a numeral code which would contain the same ordinal numeral as in Register 31a and demark a remnant still sharing the same set of preceding characters (which is no longer the case if a lower numeral code 114 is found).

Characters entered at keyboard 10 may end at any point in several words of variable length, all of these words sharing some of the succession of characters in the entered string. Completion of any given one of the words is signaled generally by the typist's entry of punctuation marks (e.g. comma, period, parentheses) or format keys 20 (e.g. space, carriage return, line feed, pitch change). Accordingly, depression of any of these particular "End-of-word" keys is deteced in known fashion and, when detected, causes setting of the End-of-word flag 35 in RAM 24D. A set state of flag 35 coinciding with the set state of word terminator flag 34 indicates that the entered character string is identical with a word stored in dictionary 56 and thus correct. At this point, then, the spelling check is over and the system is returned to its initial condition. To this end, counters 39, 118 and 119; flags 33–38 and 41; and 16-bit pointer area 55 are all cleared in preparation for entry of the initial character of the next word.

Because word terminator symbol 112 follows the last character of each word in the selected branch 85 and the Huffman code must first be converted to 5-bit code as previously described, the timing of and response to detection of WT code 112 proved unreliable, if performed when depression of an End-of-word key occured. To avoid this problem, after each successful comparison of an entered character with a character 110 in the selected branch 85, a pre-scan of the following Huffman code is performed with the appropriate conversion and then compared in ALU 29, as before, with the WT 5-bit code. If the pre-scan gives an "equal" output, then WT flag 34 is set immediately—i.e. prior to entry of the next character at keyboard 10.

Should the next key depressed at keyboard 10 prove to be an alphabetic key 18, then WT flag 34 will be immediately reset and 16-bit pointer 55 incremented by unity to point to the first bit of the next Huffman code (character) in branch 85. This next code may be an alphabetic character 110 or the numeral code 114 indicative of a nodal point. If the former, the Huffman conversion is performed and the resultant 5-bit code compared with the entered character, both as described before. If the latter, however, the resultant 5-bit code is merely saved in another byte 31a of temporary storage and pointer 55 again incremented by unity to point to the start of the next Huffman code in branch 85 (which code will be alphabetic, there being no more than two control codes between successive characters in any branch 85).

To summarize the operation of the Dictionary according to the embodiment of the invention, after the printer code for each character of a desired word entered at keyboard 18 is released from FIFO storage section 48 onto line 50, it passes to Correction Buffer 54 where it is stored for access during the usual "Correction Routine", and also converted to a 5-bit code, as described earlier, and sent to temporary storage in an area 31 of STATUS RAM 24D for direct utilization in the comparisons of the "Dictionary Routine" if this last has been enabled (flag 33 set by dual depression of code key 21 and the "D" character key 18). This storage is necessary so that more than one comparison may be performed since characters in the same ordinal position of successive words listed in Dictionary 56 and sharing all previously-entered characters must be checked to determine whether a match can be found. The initial character of a word will always be found, if alphabetic (numbers in a string exclude it from Spelling Check), because the 35,000 word listing of the present dictionary includes words beginning with every letter of the alphabet.

As an example, assume a word was just completed and Program Control 40b has initialized the counters, pointers and flags (either by resetting to ZERO or to some appropriate value—e.g. Character Counter 39 set to ONE), and that the new word to be entered is "capable". Upon entry of the "c" as the first character of the new word, search for a match is made in Table 78 because the program recognizes that entry as being the first character of a new word, Character Counter 39 being at ONE. A test is made in known fashion to ensure the character converted from the printer code of Correction Buffer 54 is alphabetic (that is, has a 5-bit code value between 1 and 26). If not, Error Flag 36 is set and beeper 19 sounded. Otherwise, the code value is multiplied by two and added to the arbitrary start address (X, say) of Table 78 in ROM 52 to locate the proper data byte area in memory—X+6 in this example, since "C" is the third character of the alphabet—and the corresponding address 88-3 (FIG. 3) is saved in the 16-bit pointer area 55. The Character Counter 39 is incremented to indicate that the next character entered will be the second in the string. The desired address having been found, the program returns to the idling routine of main program control 40a. When the second character (the first "a") is entered, the corresponding Daisy position code will be stored in Correction Buffer 54 and, as it is a printable character, the Dictionary Program 40b will be called and the Daisy position code first converted to 5-bit code using the look-up table 46, then stored in Temporary Storage 31. The value stored in 16-bit pointer area 55 is retrieved to indicate the start $2\mathbb{C}_{CA}$ of group 90-3 in look-up table 80. The arguments in this table are made up of successively higher character codes, which are followed by two bytes (16 bits) of address that point to Table 82. The entered character "a" is found to be a match on comparison with the first argument in Table 80, so the associated 16-bit address 94-3 is put into pointer area 55 for finding the proper location in Table 82 upon the next character entry, Character Counter 39 set to a three, and the program returns control to Main Program 40a.

When the third character "p" is entered at keyboard 10, the process is essentially the same, address 94-3 pointing to group 98-3 which begins with the letter B as the third character—i.e. $3\mathbb{C}_{CAB}$, but this will not yield a match. Accordingly, pointer 55 is incremented and the comparison repeated until the "p" is found. The address corresponding to the "p" is 102-7 and points to the first memory location 108 of the related branch 85 of tree 84. The third entered character having been found in table 82, a pre-scan takes place (as described) to determine the nature of the first symbol in tree structure 84 which is in Huffman Code as as signaled by the set state of HCF flag 41 (a ONE in bit 7 in the unused portion of the byte holding each 5-bit argument code in Table 82). Since this first symbol is a word terminator WT 112 (also indicated by a ONE in bit 7 of a byte—but with different significance in view of the set state of flag 41—that byte being the one defined by the 1111 code WT 112 and decoded in Huffman converter 120), then WT flag 34 is set.

On entry of the fourth character at keyboard 10 (another "a"), pointer 55 designates the WT code 112, so printer 55 is merely incremented and now designates the second symbol in branch 85 which, also being the character "a" results in a match on the usual comparison. WT flag 34 is cleared (EOW flag 35 not being set) and poionter 55 again incremented. The pre-scan for WT 112 which follows has a negative result, the next symbol being the character B. Program control is therefore returned to Main Program 40a. Upon entry of the character "b" at keyboard 10, Dictionary Program 40b will again find a match in the manner described. On entry of the sixth character "1", however, a match will not be found because the next character 10 branch 85 is the "I" 122. Because of the mismatch, Program Control 40b increments pointer 55 and transfers the "6" in Character Counter 39 to Temporary Storage 31a. It will then look for the number 6 in the numeral symbols (nodal points) 114 of branch 85. When a numeral symbol 114 is found (a ONE in bit 6 of a byte found on progressing through Huffman converter 120), the content of Temporary Storage 31a is compared subtractively with the 5-bit code (a "6" as numeral symbol 132) obtained from the next byte in Converter 120. Because they agree in this example, pointer 55 is incremented and the succeeding character ("L" 124) of branch 85 compared with the entered character. In the present example, the "L" 124 is a match, so the program again increments pointer 55, etc. and waits for entry of the last character, the "E" 126. Upon that entry and subsequent matching, the pre-scan finds WT code 133, thus setting WT flag 34. The typist's entry of a space or period, say, indicates completion of the exemplary word "capable", and sets EOW flag 35 which, being coincident with the set state of flag 34, causes dictionary program 40b to return to its initial conditions.

As stated previously, when a match is found, the result is a return to the main program 40a and the awaiting of a further entry in the string. On the other hand, if none of the comparisons in tables 78–82 or along branch 85 yield a match, then the location (93,101) holding an "End-of-Group" or "End-of-Table" or stop signal 116 is attained and the corresponding code 96 supplied from ROM 52 to Input Ports 30 via bus 50 and processed by Microprocessor 24 to set Spelling Error Flag 36. In response to the set state of Flag 36, a signal is sent over serial communication line 58 to microprocessor 60 to activate Drivers 72, in turn, so as to operate the error alarm—namely, the "beeper" 19. Thus a distinctive warble is heard immediately when a spelling error occurs.

APPENDIX A

| DATA CHARACTER | HUFFMAN CODE |
| --- | --- |
| E | 000 |
| S | 010 |
| D | 0010 |
| 5 | 0011 |
| N | 1000 |
| I | 1001 |
| WORD TERMINATOR | 1111 |
| Y | 01101 |
| 7 | 01111 |
| 4 | 10100 |
| R | 10111 |
| A | 11000 |
| G | 11001 |
| L | 11010 |
| 6 | 11011 |
| T | 11101 |
| M | 011000 |
| 9 | 011001 |
| U | 011100 |
| END OF TABLE | 101010 |
| C | 101011 |
| 8 | 111000 |
| B | 1011010 |
| P | 0111011 |
| 10 | 1011000 |
| H | 1110010 |
| O | 01110100 |
| W | 01110101 |
| V | 10110011 |
| 11 | 10110110 |
| F | 10110111 |
| K | 11100111 |
| 12 | 101100100 |
| Z | 101100101 |
| 3 | 111001101 |
| Q | 1110011000 |
| 13 | 1110011010 |
| X | 1110011011 |
| 14 | 111001100010 |
| J | 111001100111 |
| 15 | 1110011001100 |
| APOSTROPHE | 111001100011011 |
| 18 | 111001100011011000 |

APPENDIX A-continued

| DATA CHARACTER | HUFFMAN CODE |
| --- | --- |
| 17 | 111001100011011001 |
| 16 | 111001100011011010 |
| 20 | 11100110001101011 |
| 19 | 111001100011010111 |

What is claimed is:

1. A dictionary storage apparatus containing a word list used to verify the spelling order of character inputs comprising:

input means for receiving character inputs;

a first storage means for storing character information structured to sequentially check the spelling order of a first predetermined series of received character inputs;

a second storage means extending from said first storage means and containing further character information structured to check the spelling order of a variable string of character inputs strung from said predetermined series to validate spelling of words; and signal output means connected to said first and second storage means for generating a signal immediately in response to a received character input being out of spelling order as structured in said first and second storage means.

2. A dictionary storage apparatus for use with a source of characters, the apparatus containing a list of correctly-spelled words for verifying the spelling order of character inputs, comprising:

(a) word terminators in said list, one said terminator distinguishing each complete word therein, (b) input means for receiving character inputs in a first code format, (c) a first storage means for storing character information structured to sequentially check the spelling order of a first predetermined series of received character inputs, said character information in said first storage means being in said first code format and held in a plurality of bytes, one character per byte, and comprising a succession of character sequences having at least two characters therein, a first character selected from all characters of the alphabet and groups identified by a particular one of said first characters in combination with at least one other alphabetic character, at least some of said groups being less in number than the entire alphabet;

(d) a second storage means extending from said first storage means and containing further character information structured to check the spelling order of a variable string of character inputs strung from said predetermined series to validate spelling of words, said further character information in said second storage means comprises a tree structure with a plurality of branches, each of said branches stemming from a discrete one of said sequences in said first storage means and at least one word remnant being associated with said discrete one sequence, said word remnant containing at least one character held in a second code format and being followed by said word terminator;

(e) normally disabled means decoding said second code format into said first code format, said means for decoding being enabled at the end of each said discrete one sequence;

(f) comparison means operable upon receipt of each said character input and effective to check agreement between the received one of said character inputs and ordinally corresponding ones of said character information as to words stored in said first storage means and in said second storage means, and (g) signal output means connected to said first and second storage means for generating a signal immediately in response to a received character input being out of spelling order as structured in said first and second storage means and determined by said comparison means.

3. The dictionary storage apparatus of claim 2, wherein said character inputs include an end-of-word input, a plurality of word remnants is associated with said discrete one sequence and held in said second code format; a last one of said plurality being followed by a said word terminator; and said output means are operable to generate said signal upon receipt of a character input other than said end-of-word input in ordinal correspondence with the word terminator following said last word remnant.

4. The dictionary storage apparatus of claim 2, wherein at least one said sequence includes a said word terminator, said second format is a compressed code format having variable numbers of bits for the different characters, some characters having a bit-length in excess of a byte, and said word terminator has a discrete code in said first format and said second format.

5. The dictionary storage apparatus of claim 2, wherein said first code format requires less than all bits of said byte to distinguish said characters, at least one bit being in excess, and said decoding means for said second code format is enabled in response to a predetermined state of said excess one bit.

6. The dictionary storage apparatus of claim 5, wherein said first code format stores said character code in the less significant five bits of said byte and the set state of the most significant bit of said byte indicates the ordinal position for enabling said second code format decoding means.

7. The dictionary storage apparatus of claim 6, wherein said second code format decoding means includes means counting bytes and bits occupied by the variable numbers of bits in given codes.

8. A dictionary storage apparatus for use with a source of characters, the apparatus containing a list of correctly-spelled words for verifying the spelling order of character inputs, comprising:

(a) input means for receiving character inputs,
(b) an end-of-word input among said characer inputs,
(c) a starting address for said word list,
(d) a first storage means for storing character information structured to sequentially check the spelling order of a first predetermined series of received character inputs, said character information in said first storage means being held in groups by alphabetic order of association in particular sets of character combinations having a predetermined number of characters,
(e) a second storage means xtending from said first storage means and containing further character information structured to check the spelling order of a variable string of character inputs strung from said predetermined series to validate spelling of words, said further character information in said second storage means comprising a tree structure with a plurality of branches, each of said branches stemming from a discrete one of said sets and holding a plurality of character-containing word remnants associated with said discrete one set;
(f) means for sequentially scanning said character information, beginning with said starting address;
(g) signal output means connected to said first and second storage means for generating a signal immediately in response to received character input being out of spelling order as structured in said first and second storage means and determined by said comparison means,
(h) a word terminator code marking the end of each word in said character information stored in said first storage means and in said second storage means, and
(i) further means operable to return said scanning means to said starting address in response to receipt of said end-of-word input while scanning said word terminator code marking the end of a word in said list.

9. The dictionary storage apparatus of claim 8, further including an end-of-table character, and wherein said first and second storage means include blocks of a register, each branch having said character information therein stored in a respective block, at least some characters of said word remnants being found in separate, random-length word portions hierarchically interspersed in said block in accordance with the order of the alphabet, and said word terminator following a last word remnant in each branch being followed in turn by said end-of-table character.

10. A method of checking the spelling of words entered into a record by a keyboard operator, comprising the steps of:

(a) compactly storing a list of words in a first multi-character memory device,
(b) entering a string of characters into a second memory device, each character of said string representing an element at a next higher ordinal position in a word said operator desires to enter in said record,
(c) scanning discrete portions of said first memory device concomitantly with each entry of a further character of said string,
(d) responsive to each said entry, comparing said further character with a succession of scanned characters at a corresponding ordinal position in each word of said list stored in said first memory device, previous characters in said each word matching previously entered characters of said string, and
(e) issuing a distinctive signal immediately upon determining existence of a mismatch between said further character and said succession of scanned characters at said corresponding ordinal position.

11. The method of claim 10, wherein said storing step is effected in two stages:

(i) a first stage storing preselected permutations of a predetermined number m of alphabetic characters appearing as an initial sequence only in words of said list, said permutations being arranged in alphabetically-ordered sets and subsets, each m-th character of a sequence being an argument of a look-up table having a corresponding address value indicative of the starting location of an alphabetically-ordered subset of (m+1)th characters forming an individual group, with each (m+1)th character of the augmented sequence being an argument of a further look-up table having a corresponding address value indicating start of a further alphabetically ordered set of n characters having a particular one of said m+1 character permutations in common; m being less than or equal to n, but greater than or equal to 1;

(ii) a second stage storing a plurality of word remnants, each remnant containing at least one further character completing a word of said word list, and being comprised in said set of n characters combined with said particular one of the permutations.

* * * * *